US008712456B2

(12) United States Patent
Feng et al.

(10) Patent No.: US 8,712,456 B2
(45) Date of Patent: Apr. 29, 2014

(54) METHOD AND SYSTEM OF CHANNEL DETECTING AND REPORTING, TERMINAL, AND MANAGEMENT CENTER

(75) Inventors: Shulan Feng, Shenzhen (CN); Jinnan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 13/011,490

(22) Filed: Jan. 21, 2011

(65) Prior Publication Data

US 2011/0124356 A1    May 26, 2011

Related U.S. Application Data

(63) Continuation of application No. PCT/CN2009/070407, filed on Feb. 12, 2009.

(30) Foreign Application Priority Data

Jul. 21, 2008    (CN) .......................... 2008 1 0116943

(51) Int. Cl.
*H04B 15/00*    (2006.01)
(52) U.S. Cl.
USPC ..................... 455/501; 455/67.11; 455/414.4; 455/79; 455/296; 455/33.1; 455/62; 455/426; 455/422.14; 455/424; 455/450; 370/315; 370/328; 370/335; 370/341; 370/356
(58) Field of Classification Search
USPC .............. 455/67.11, 414.4, 79, 296, 33.1, 62, 455/426; 370/328, 335, 341, 342, 356, 389
See application file for complete search history.

(56) References Cited

U.S. PATENT DOCUMENTS

| | | | | |
|---|---|---|---|---|
| 4,216,432 A | * | 8/1980 | Imazeki et al. | ................. 455/79 |
| 5,594,949 A | * | 1/1997 | Andersson et al. | ........... 455/437 |
| 6,047,175 A | * | 4/2000 | Trompower | ............... 455/452.1 |
| 7,092,732 B2 | * | 8/2006 | Tamaki et al. | ................ 455/522 |
| 7,158,491 B1 | * | 1/2007 | Le | ................................ 370/328 |

(Continued)

FOREIGN PATENT DOCUMENTS

| CN | 1448853 A | 10/2003 |
|---|---|---|
| CN | 1514622 A | 7/2004 |

(Continued)

OTHER PUBLICATIONS

Office Action issued in corresponding Chinese Patent Application No. 200810116943.5, mailed Jul. 26, 2011.

(Continued)

*Primary Examiner* — Matthew D. Anderson
*Assistant Examiner* — Ganiyu A Hanidu
(74) *Attorney, Agent, or Firm* — Brinks Gilson & Lione

(57) ABSTRACT

A method and a system of channel detecting and reporting, a terminal, and a management center are provided. The method includes: a first access device of a terminal detects a channel status of one or more channels; and a second access device of the terminal reports a channel detection result detected by the first access device to destination equipment through an access network. The system includes a terminal and a management center. The terminal can access an access network through various access devices and report a channel detection result to the management center. The management center adjusts communication parameters of relevant equipment according to the detection result. The channel detection result can be reported in time, so that communication dead zones are prevented, and probability of long-term interference on hidden nodes in a communication system is reduced.

19 Claims, 4 Drawing Sheets

(56) References Cited

U.S. PATENT DOCUMENTS

| | | |
|---|---|---|
| 7,573,876 B2 | 8/2009 | Lebizay et al. |
| 7,782,764 B2 * | 8/2010 | Zi .................................. 370/218 |
| 2003/0074469 A1 * | 4/2003 | Busi et al. ..................... 709/238 |
| 2007/0076719 A1 * | 4/2007 | Allan et al. .................... 370/392 |
| 2008/0056251 A1 * | 3/2008 | Zheng ........................... 370/389 |
| 2008/0101331 A1 * | 5/2008 | Lee et al. ....................... 370/350 |
| 2008/0107069 A1 * | 5/2008 | Wu et al. ....................... 370/329 |
| 2008/0186952 A1 * | 8/2008 | Lin et al. ....................... 370/352 |
| 2008/0232487 A1 * | 9/2008 | Cleveland et al. ............ 375/260 |

FOREIGN PATENT DOCUMENTS

| | | |
|---|---|---|
| CN | 1977495 A | 6/2007 |
| CN | 101179821 A | 5/2008 |
| CN | 101222376 A | 7/2008 |
| WO | 2007/099517 A1 | 9/2007 |

OTHER PUBLICATIONS

Written Opinion of the International Searching Authority issued in corresponding PCT Patent Application No. PCT/CN2009/070407, mailed May 21, 2009.

08HS031 Patent Retrieval Record.

International Search Report issued in corresponding PCT Application No. PCT/CN2009/070407; mailed May 21, 2009.

* cited by examiner

METHOD AND SYSTEM OF CHANNEL DETECTING AND REPORTING, TERMINAL, AND MANAGEMENT CENTER

CROSS-REFERENCE TO RELATED APPLICATIONS

This application is a continuation of International Application No. PCT/CN2009/070407, filed on Feb. 12, 2009, which claims priority to Chinese Patent Application No. 200810116943.5, filed on Jul. 21, 2008, both of which are hereby incorporated by reference in their entireties.

FIELD

The present disclosure relates to the field of wireless communications, and in particular, to a method and a system of channel detecting and reporting, a terminal, and a management center.

BACKGROUND

In wireless communication systems, to prevent and reduce interference among the systems, radio equipment is required to detect an ambient wireless environment in real time, and dynamically adjust working parameters thereof according to the ambient wireless environment. Because the detection range covered by the equipment is limited, two nodes may not be able to detect each other, but one node may still interfere with equipment accessing the communication link of the other node.

Referring to FIG. 1, it is a schematic diagram of interference generated between nodes in a wireless communication system. A node A and a node B cannot detect each other, so that the node A and the node B do not interfere with each other. However, the node A may interfere with a node B1 in the communication link of the node B. Accordingly, the node B may interfere with a node A1 in the communication link of the node A. Assuming that the node A is a TV transmitter, the node B is a wireless broadband access base station, both the node A and the node B work in a channel 1, and the node B1 is a wireless broadband access terminal. When accessing the network through the base station B, the node B1 is interfered by the node A and cannot access the base station, and a communication dead zone is generated around the node B1. Accordingly, a TV receiver A1 in an area covered by the node B may also be interfered by the node B. The node A1 is called a hidden node of the node B, in which the hidden node is a node being interfered and not known by the interference source or other equipment.

In the prior art, the node B1 can perform corresponding channel detecting. When detecting strong interference in the channel 1, the node B1 reports a detection result of the channel to the node B.

During implementation of the present invention, the inventors find that the prior art at least has the following defects. The node A and the node B interfere with each other, so the node B1 cannot access the base station B, and the node B1 cannot report the detection result of the channel cannot to the node B, so that the node B1 is in the communication dead zone all the time without knowing the situation, and the stability and reliability of communications are seriously harmed. Accordingly, because the node B interferes with the communication link of the node A, the TV receiver A1 in the area covered by the node B is interfered by the node B for a long time, which greatly affects receiving quality of the TV receiver, A1.

SUMMARY

The present invention is directed to a method and a system of channel detecting and reporting, a terminal, and a management center, so that communication dead zones are prevented, and probability of long-term interference on hidden nodes in a communication system is reduced.

An embodiment of the present invention provides a method of channel detecting and reporting. The method includes:
detecting, by a first access device of a terminal, a channel status of one or more channels; and
reporting, by a second access device of the terminal, a channel detection result obtained by the detecting by the first access device to destination equipment through an access network.

An embodiment of the present invention provides a method for managing a channel detection result. The method includes:
receiving a channel detection result sent by a terminal, in which the channel detection result includes an identity (ID) of the terminal and a channel status of a channel; and
sending an adjustment command to adjust communication parameters of equipment that affects the channel detected by the terminal, according to the channel detection result of the channel.

An embodiment of the present invention provides a terminal. The terminal includes: at least two access devices, in which a first access device is configured to detect a channel status of a channel, and a second access device is configured to report a channel detection result of the channel to destination equipment through an access network.

An embodiment of the present invention provides a management center. The management center includes:
a network receiving module, configured to receive a channel detection result sent by a terminal, in which the channel detection result includes an ID of the terminal and a channel status of a channel;
a control module, configured to generate an adjustment command according to the channel detection result of the channel and/or an operational status of other equipment in an area of the terminal, in which the adjustment command is configured to adjust communication parameters of equipment that affects the channel detected by the terminal; and
a network sending module, configured to send the adjustment command generated by the control module to the equipment that affects the channel detected by the terminal.

An embodiment of the present invention provides a system of channel detecting and reporting. The system includes:
a terminal, configured to detect a channel status of a channel, and send a channel detection result of the channel to the management center through different access networks; or configured to receive a channel detecting command of the channel sent by the management center, and detect the channel according to the detection command; and
a management center, configured to receive the channel detection result of the channel sent by the terminal, and send an adjustment command to adjust communication parameters of equipment that affects the channel detected by the terminal, according to the channel detection result, or send the channel detecting command of the channel to the terminal.

According to the embodiments of the present invention, when a first access device of a terminal accessing an access network is interfered and thus cannot report a channel detection result, the terminal may access an access network through another access device, and report the channel detection result of a channel detected by the first access device to destination equipment through the access network accessed by another access device, so that the destination equipment can accurately obtain a situation of the interference on the terminal in time, and the destination equipment may adjust relevant parameters in time according to the reported channel detection result. Thus, areas being interfered can be avoided, communication dead zones are prevented. In addition, the probability of long-term interference on hidden nodes is reduced.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention is clearly described in the following with reference to the accompanying drawings. It is obvious that the embodiments to be described are only a part rather than all of the embodiments of the present invention. Based on the embodiments of the present invention, all other embodiments obtained by persons skilled in the art without creative efforts shall fall within the protection scope of the present invention.

Specific embodiments of the present invention are described in further detail below with reference to the accompanying drawings.

Figure 2:
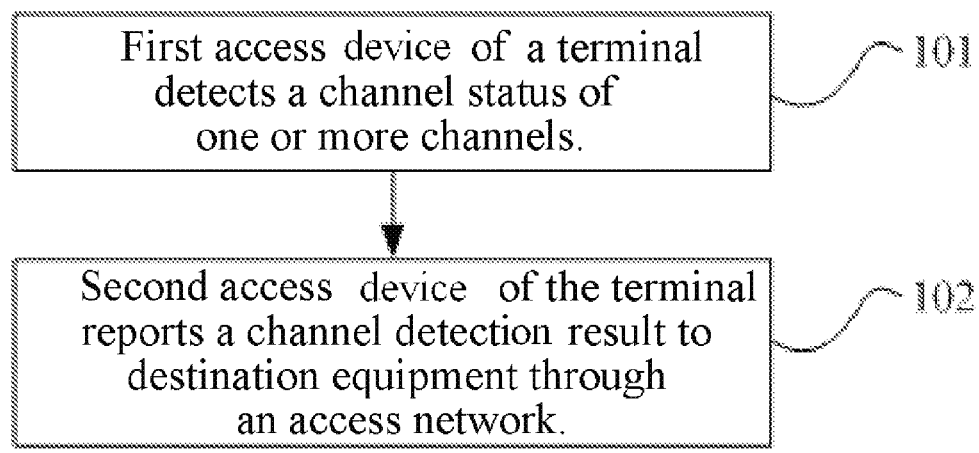
FIG. 2 is a flow chart of a first embodiment of a method of channel detecting and reporting according to the present invention.

Referring to FIG. 2, it is a flow chart of a first embodiment of a method of channel detecting and reporting according to the present invention. In this embodiment, a terminal may include multiple access devices. To make the description concise, in this embodiment, the first access device and second access device are set as an example for illustration, and other access devices have the same function and the same structure as the first access device and the second access device. The method according to this embodiment includes the following steps:

Step 101: The first access device of the terminal detects a channel status of one or more channels.

In this embodiment, the access device of the terminal can detect a channel of a frequency band supported by the access device, and can also detect a channel set to be detected by other equipment in a network or the terminal. For a multi-mode terminal, frequency bands that may be detected by the access device of the terminal are a union set of frequency bands supported by each mode of the terminal. The channel status includes a status indicating whether interference exists in a channel, and a degree of the interference if the interference exists. The channel status may further indicate whether a channel is idle. If the channel is not idle, the terminal can detect whether a system of an accessible channel exists, for example, the terminal can detect a signal of an accessible base station.

Step 102: The second access device of the terminal reports a channel detection result detected by the first access device to destination equipment through an access network.

When the first access device of the terminal is interfered and therefore cannot access the system, the terminal accesses a connected access network through the second access device, and sends the channel detection result detected by the first access device to the destination equipment in a backbone network, an Internet Protocol (IP) network, or other access networks through the access network. The destination equipment may be a radio spectrum management center, a radio spectrum detection center, or other radio equipment. Specifically, the destination equipment may be persistent fixed equipment, such as a national spectrum center, or may be temporary detection equipment, such as spectrum detection equipment, a base station, or a terminal. The terminal may be a mobile phone, a notebook computer, a Personal Digital Assistant (PDA), or a desktop computer. The channel detection result reported by the terminal may include an ID of the first access device of the terminal and the channel status. After receiving the channel detection result, the destination equipment judges the situation of the interference on the first access device of the terminal according to the ID of the first access device of the terminal and the channel detection result, adjusts communication parameters of other equipment in the system of the first access device of the terminal, such as a base station and a terminal, for example, adjusts the base station to work in other channels, or adjusts a transmission power of the base station and the terminal, or turns off or adjusts equipment causing the first access device of the terminal to be interfered according to the situation of the interference on the first access device of the terminal, or adjusts communication parameters of the first access device of the terminal, for example, adjusts the first access device of the terminal to another channel having weaker or no interference. Therefore, communication dead zones of the area of the first access device of the terminal are eliminated, the probability of long-term interference on hidden nodes is reduced. In addition, other communication parameters, such as the transmission power, may be adjusted.

In this embodiment, when the first access device of the terminal accessing the network is interfered and therefore cannot report the channel detection result, the terminal may access the access network through another access device, and report the channel detection result of the channel detected by the first access device to the destination equipment through the access network of another access device, so that the destination equipment can accurately obtain the situation of the interference on the first access device of the terminal in time, and the destination equipment can adjust relevant parameters in time according to the reported channel detection result. Therefore, the areas being interfered can be eliminated, the communication dead zones are prevented. In addition, the probability of long-term interference on the hidden nodes is reduced.

Figure 3:
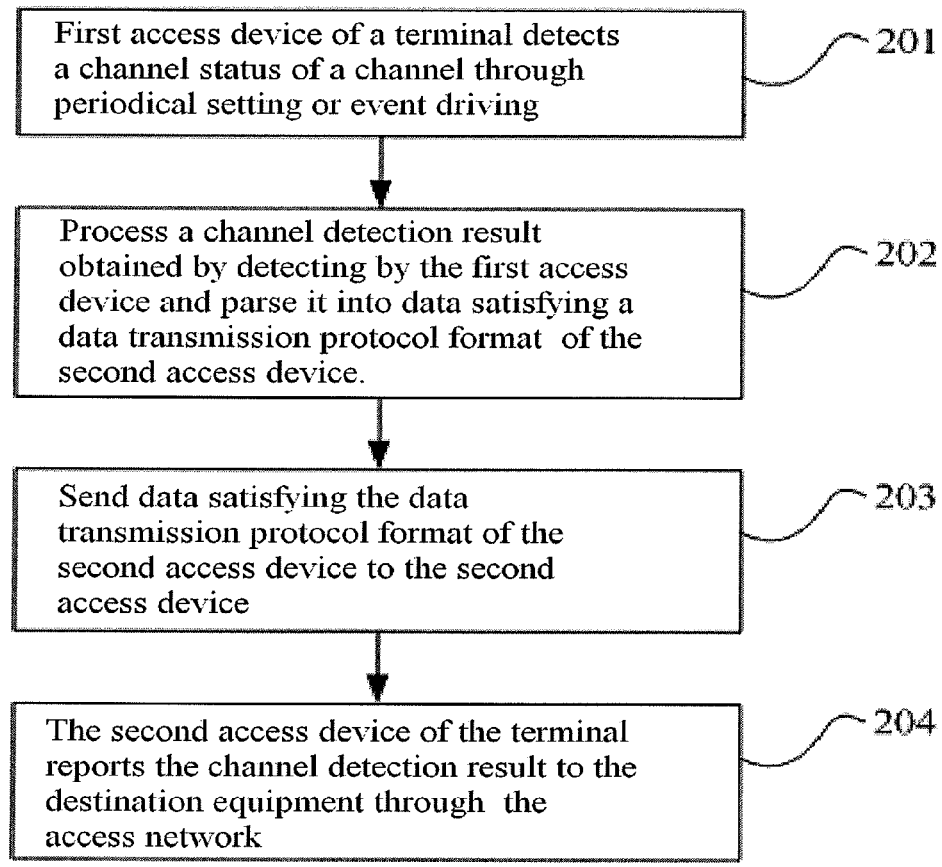
FIG. 3 is a flow chart of a second embodiment of a method of channel detecting and reporting according to the present invention.

Referring to FIG. 3, it is a flow chart of a second embodiment of a method of channel detecting and reporting according to the present invention. The method according to this embodiment includes the following steps:

Step 201: First access device of a terminal detects a channel status of a channel through periodical setting or event driving.

After being turned on, the terminal may access a backbone network or an IP network by selecting an access device capable of accessing an access network. At this time, the terminal may detect a channel status of a frequency band supported by the terminal through the periodical setting or the event driving. Specifically, the terminal may detect the channel in the following manner:

A detection command of the channel is received from the accessible access network. The detection command is processed, and is sent to the first access device. The first access device detects a channel status of the channel to be detected corresponding to the detection command of the channel. The detection command includes an ID of the terminal or other identifiers used to identify the terminal, such as a Media Access Control (MAC) address of the first access device. The detection command further includes the channel to be detected, in which the channel to be detected may be a channel distinguished by one or more spectrums, or one or more code words, such as orthogonal codes and/or scrambling codes.

Specifically, the receiving, by the terminal, the detection command sent by other equipment to detect the channel may include the following steps:

The detection command of the channel is received by second access device. The detection command is parsed into data that may be identified by the terminal. The detection command includes the ID of the terminal and the channel to be detected. The detection command may further include detection time.

The detection command that may be identified by the terminal is processed.

The processed detection command is parsed into data in a format that may be identified by the first access device, and is sent to the first access device.

After receiving the detection command of the data in a format that may be identified by the first access device, the first access device detects the channel status of the channel to be detected according to the detection command.

The terminal may receive the detection command through the access network that may be accessed by the terminal, process the detection command, and send the detection command to the first access device capable of detecting the channel. The first access device of the terminal detects the channel status of the channel to be detected.

Alternatively, the terminal may set a detection command of the channel, and send the detection command to the first access device. The first access device detects the channel status of the channel. The detection command includes the channel to be detected and the detection time. The terminal may trigger the detection command according to the detection time, to detect the channel at the set detection time.

Specifically, the terminal may set a detection cycle, so that at intervals, such as every one hour, the terminal detects the channel status of one or more channels. In this way, detection is performed through periodical setting, and further, the detection result may be reported.

Alternatively, if the terminal detects that the network signal of a second access network is too weak, or the network of the second access network cannot satisfy the communication needs thereof due to reasons such as network congestion, the terminal triggers the first access device to execute the detection command to detect whether a first access network has an available channel.

The reporting of the detection result may be performed periodically, or selectively according to the detection result. For example, if interference on the channel is detected, the reporting may be performed, and if no interference exists, the reporting may not be performed.

Furthermore, the terminal may also receive a detection command input from outside and including the channel to be detected, and send the detection command to the first access device. The first access device detects the channel status of the channel to be detected. For example, the terminal may receive a detection command input by using a keyboard or a mouse. The detection command may further include the detection time. The terminal may perform periodical detection, or special detection for one time according to the detection time input by a subscriber.

A user may input information, such as the channel to be detected and the detection time, by using peripheral input equipment of the terminal, such as a keyboard or a mouse. The first access device of the terminal detects the channel status of the channel. The terminal may perform periodical detection, or special detection for one single time according to the detection time input by the subscriber.

In this embodiment, according to actual needs, the specific channel specified in the received detection command may be detected, or a detection request of other equipment may be received, or detection may be performed according to the needs of the terminal.

Step 202: Process the channel detection result obtained by detecting by the first access device and parse it into data satisfying a data transmission protocol format of the second access device.

After the channel detection result detected by the first access device is processed and parsed, a part of or all the detection data may be reported as required, and the detection result required to be reported is parsed into data in a format that may be identified by the second access device. Because different access devices and data transmission formats of corresponding access networks thereof are not the same, transmission can be performed only after the data to be transmitted is parsed into a data format that may be identified. Therefore, by parsing the detection result, the second access device can accurately send the detection result to destination equipment in a backbone network or an IP network in time through an access network corresponding to the second access device.

In this embodiment, according actual needs, the reported channel detection result may further include a central frequency of the channel, and/or a bandwidth of the channel, and/or a signal energy of the channel received by the terminal, and/or the time of the detection performed by the terminal on the channel, and/or a geographic location of the terminal during the detection. The geographic location of the terminal may be a geographic location set by the terminal, or a geographic location of the terminal obtained through a Global Positioning System (GPS). At the same time, the terminal may also update the geographic location set by the terminal according to geographic location information obtained through the GPS. The subscriber may also update or set the geographic location of the terminal with geographic location information input by input equipment.

The detection result may further include other information, such as the credibility of the detection. For example, when interference on a channel is detected, the detection may be performed on the channel for several times, and the detection probability is added into the detection result as the credibility.

Step 203: Send data satisfying the data transmission protocol format of the second access device to the second access device.

Step 204: The second access device of the terminal reports the channel detection result to the destination equipment through the access network. The channel detection result includes the ID of the terminal performing the detection and the channel status. Specifically, the second access device of the terminal is connected to the accessible access network corresponding to the second access device, is connected to the backbone network or the IP network through the access network, and sends the channel detection result to the destination equipment connected to the backbone network or the IP network through the backbone network or the IP network. For example, the channel detection result is sent to a base station in the access network of the second access device by the second access device, and is sent to the destination equipment in the backbone network or the IP network by the base station through the backbone network or the IP network. Furthermore, the ID of the terminal may be other identifiers that can identify the terminal, such as the MAC address of the first access device of the terminal performing the detection.

The access network that may be accessed by the second access device may be a Wireless Local Area Network (WLAN), a Wireless Metropolitan Area Network (WMAN), a cellular mobile network, a Wireless Personal Area Network (WPAN), a Wireless Wide Area Network (WWAN), or Ethernet. Each access network may have a corresponding base station, and is connected to the backbone network or the IP network through the base station. The backbone network and the IP network may be the Internet, or a Public Switched Telephone Network (PSTN).

In addition, the access terminal in this embodiment may be various wireless network cards, such as a Wireless Regional Area Network (WRAN) network card for the WWAN, a Worldwide Interoperability for Microwave Access (WiMAX) network card for the WMAN, or a Wireless Fidelity (WiFi) network card for the WLAN, or may be an Asymmetric Digital Subscriber Line (ADSL) network card, or an Ethernet card. In this embodiment, the access device at least includes a wireless network card to detect an ambient wireless environment of the terminal, so that the channel status of the channel may be detected by the wireless network card.

The destination equipment may be a radio spectrum management center, a radio spectrum detection center, or other radio equipment. Specifically, the destination equipment may be persistent equipment, such as a national spectrum center, or may be temporary detection equipment, such as spectrum detection equipment, a base station, or a terminal. The terminal may be a mobile phone, a notebook computer, a PDA, or a desktop computer. After receiving the channel detection result, the destination equipment adjusts communication parameters of the terminal or communication parameters of relevant equipment affecting the detected channel of the terminal according to the detection result and/or an operational status of other equipment in an area of the terminal. Therefore, channel interference of the area of the terminal is prevented, communication dead zones are prevented. In addition, a risk of hidden nodes is reduced, and the probability of interference on the hidden nodes is reduced.

Specifically, in this embodiment, if the destination equipment is the radio spectrum management center, after receiving the channel detection result, the radio spectrum management center may adjust the communication parameters of the other equipment in a working system of the terminal, such as the communication parameters of a base station, and adjust the channel of the base station according to the interference situation in the channel detection result, or may adjust or turn off channels of relevant equipment in other systems that cause the terminal to be interfered according to the situation of the interference on the terminal. Therefore, the communication dead zones of the area of the terminal are eliminated. In addition, possible hidden nodes in the area being interfered are eliminated, and the probability of long-term interference on the hidden nodes is reduced. The radio spectrum management center may also wholly adjust radio equipment in the area according to a radio spectrum distribution condition of the area of the terminal, so that the communication dead zones in the area are prevented, the hidden nodes are reduced, and the probability of interference on the hidden nodes is reduced.

In this embodiment, the channel status of the channel can be detected according to different detection needs. At the same time, the data between the different acc ess devices is processed and parsed, so that data is switched between the access device accurately and conveniently, which makes the detecting of the channel and the reporting of the detection result easy. Thus, the destination equipment can perform processing in time, the communication dead zones and the hidden node are easily found in time, the communication dead zones are prevented, and the probability of the long-term interference on the hidden nodes is reduced.

Figure 4:
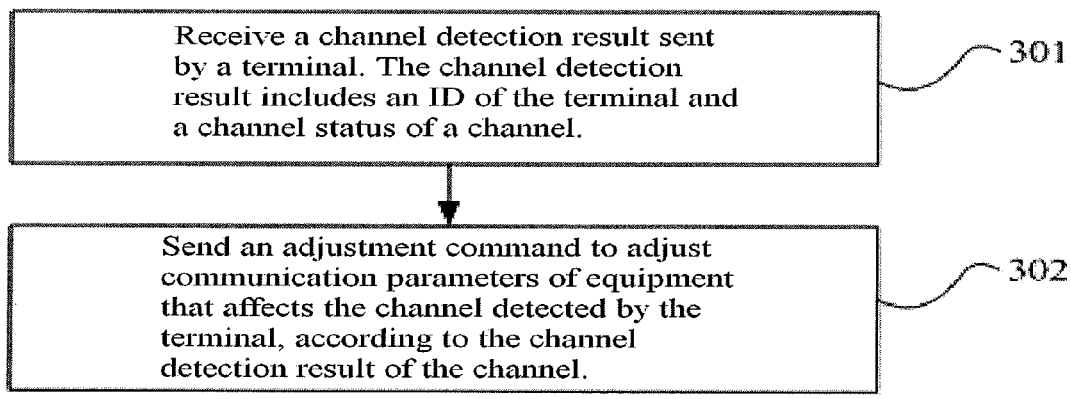
FIG. 4 is a flow chart of an embodiment of a method for managing a channel detection result according to the present invention.

Referring to FIG. 4, it is a flow chart of an embodiment of a method for managing a channel detection result according to the present invention. The method according to this embodiment includes the following steps:

Step 301: Receive a channel detection result sent by a terminal. The channel detection result includes an ID of the terminal and a channel status of a channel.

When the terminal sends the channel detection result of the detection to destination equipment through a backbone network or an IP network, the destination equipment receives the channel detection result through the backbone network or the IP network. The destination equipment may be a radio spectrum management center, a radio spectrum detection center, or other radio equipment. In this embodiment, the destination equipment is the radio spectrum management center. The terminal may perform the detecting and reporting according to a detection command or a detection request sent by the radio spectrum management center. After receiving the detection command sent by the radio spectrum management center, the terminal detects the channel status of the channel according to the detection command, and reports a detection result. Alternatively, the terminal may detect the channel and report the channel detection result according to a detection command set by the terminal or input by a subscriber. The detection result reported by the terminal may further include a central frequency of the channel, and/or a bandwidth of the channel, and/or a signal energy of the channel received by the terminal, and/or time of the detection performed by the terminal on the channel, and/or a geographic location of the terminal during the detection. The geographic location of the terminal may also be judged by the radio spectrum management center according to the ID of the terminal.

Furthermore, the ID of the terminal in the detection result may also be other identifiers that can identify the terminal. For example, an MAC address of the first access device performing the detection.

Step 302: Send an adjustment command to adjust communication parameters of equipment that affects the channel detected by the terminal, according to the channel detection result of the channel.

After receiving the channel detection result sent by the terminal, the radio spectrum management center may judge whether communication parameters of the terminal or other equipment are required to be adjusted according to the channel status. If a channel of a working frequency band of the terminal is interfered, the radio spectrum management center may adjust communication parameters of radio equipment causing the interference according to the channel being interfered. For example, a working channel of the first access device is adjusted, so that the first access device of the terminal working in a channel after the adjustment is no longer interfered. Alternatively, the equipment causing the interference on the channel may be adjusted, and the equipment causing the interference on the channel is turned off. Alternatively, the equipment causing the interference on the channel is adjusted to work in other idle channels. With the adjustment, communication dead zones and hidden nodes may be eliminated, and the probability of long-term interference on the hidden nodes is reduced.

Furthermore, the radio spectrum management center may further store the channel detection result sent by the terminal, and add the channel detection result into a radio spectrum distribution condition of an area of the terminal. The radio spectrum distribution condition may include an ID and working parameters of each piece of equipment in the area, and may also include a location, and/or antenna parameters, and/or a transmission power of each piece of equipment. At the same time, the radio spectrum management center may also adjust a working channel of the terminal, and/or working channels of other equipment in a working system of the terminal, and/or working channels of equipment in other systems affecting the working channel of the terminal by sending the adjustment command according to the channel detection result and the radio spectrum distribution condition.

Specifically, the radio spectrum management center manages the radio spectrum distribution condition. The radio spectrum management center may manage the radio spectrum of each area uniformly. The radio spectrum distribution condition may include a location, a working frequency, an antenna, and a transmission power of each piece of equipment in the areas. Upon receiving a channel detection result sent by a terminal, the radio spectrum management center adds the detection result of the terminal into a radio spectrum distribution condition of an area of the terminal. At the same time, the radio spectrum management center may adjust communication parameters of relevant equipment in the area according to all the radio spectrum distribution conditions in the area, so that communication dead zones are prevented, and the probability of long-term interference on possible hidden nodes is reduced.

In this embodiment, the destination equipment may also designate each terminal to perform specific channel detecting to obtain the radio spectrum distribution condition by sending the detection command according to the needs of the destination equipment.

This embodiment may further be applied to detection for a spectrum plan. The embodiment of the present invention may be used as temporary detection equipment to collect a radio spectrum condition of each area. Specifically, the temporary detection equipment sends a detection command to terminal equipment in each area. The terminal equipment detects a use condition of each channel according to the detection command, and reports a result of the detection to the temporary detection equipment. The temporary detection equipment adds the collected channel detection result into a radio spectrum distribution condition, and plans the radio spectrum of each area reasonably according to the radio spectrum distribution condition, so that the use effect of the radio spectrum is improved.

In this embodiment, according to the channel detection result reported by the terminal, the communication parameters of the other equipment interfering with the working channel of the terminal can be adjusted. Therefore, the communication dead zones in the area of the terminal are prevented. In addition, the hidden nodes can be found in time, and the probability of long-term interference on the hidden nodes is reduced.

Figure 5:
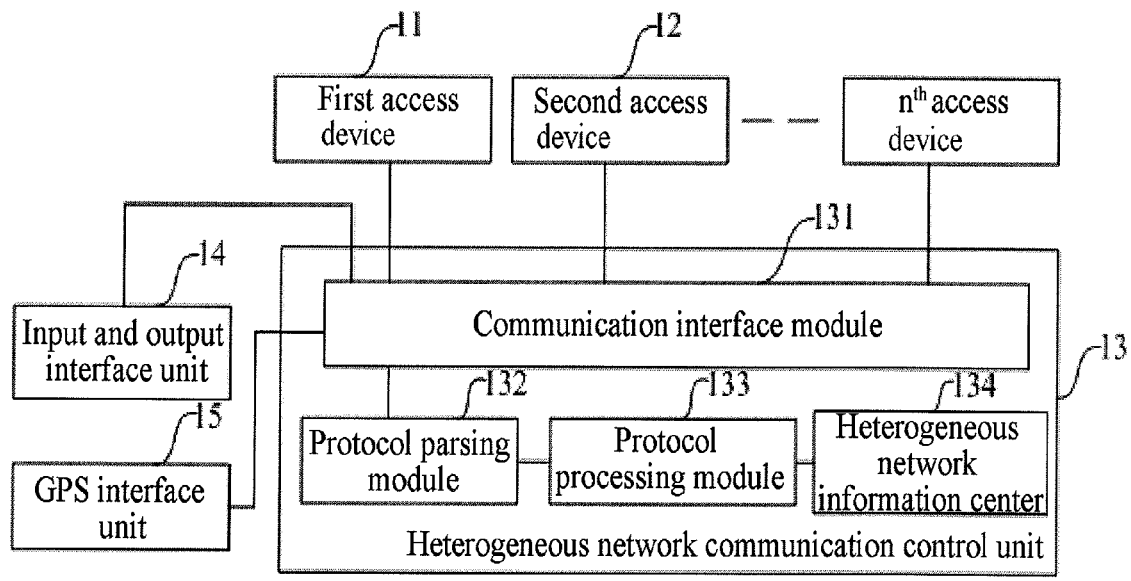
FIG. 5 is a schematic structural view of an embodiment of a terminal according to the present invention.

Referring to FIG. 5, it is a schematic structural view of an embodiment of a terminal according to the present invention. In this embodiment, the terminal includes at least two access devices, which are first access device 11, configured to detect a channel status of a channel; and second access device 12, configured to report a channel detection result of the channel to destination equipment through an access network, in which the channel detection result includes an ID of the terminal and the channel status, and the channel status includes a status indicating whether the channel is idle or whether interference exists.

In this embodiment, the terminal may further include a heterogeneous network communication control unit 13, configured to receive a detection command of the channel, parse and process the detection command, and send the detection command to the first access device 11, or configured to process and parse the channel detection result, and send the channel detection result to the second access device 12.

The heterogeneous network communication control unit 13 may include a communication interface module 131, a protocol parsing module 132, a protocol processing module 133, and a heterogeneous network information center 134. The communication interface module 131 is configured to receive the channel detection result from the first access device 11, and send the channel detection result to the protocol parsing module 132; or is configured to receive the detection command from the second access device 12, and send the detection command to the protocol parsing module 132; or is configured to receive the channel detecting command from the protocol parsing module 132, and send the channel detecting command to the first access device 11; or is configured to receive the channel detection result from the protocol parsing module 132, and send the channel detection result to the second access device 12. The protocol parsing module 132 is configured to receive the channel detection result or the detection command sent by the communication interface module 131, parse the channel detection result or the detection command into data in a format that may be identified by the terminal, and send the formatted data to the protocol processing module 133; or is configured to receive a signal of the protocol processing module 133, parse the signal into data in a format that may be identified by corresponding access device, and send the formatted data to the communication interface module 131. The protocol processing module 133 is configured to receive the data in a format that may be identified by the terminal and sent by the protocol parsing module 132, send the channel detection result or the detection command to the protocol parsing module 132 or the heterogeneous network information center 134 after processing the channel detection result or the detection command. The processing performed by the protocol processing module 133 may include, but is not limited to, merging some channel detecting commands, triggering a channel detecting command, or merging some channel detection results. The heterogeneous network information center 134 is configured to obtain and store an operational status and parameters of each access device of the terminal. The parameters include channel information of a channel that may be detected by the access device and protocol format information of the access network that may be accessed by the access device. The working status and the parameters of each access device of the terminal are obtained by the protocol processing module from each access device. In this embodiment, the terminal may further include an input and output interface unit 14, configured to input the detection command of the channel, or configured to output the channel detection result. In this embodiment, the terminal may further include a GPS interface unit 15, configured to obtain position information of the terminal through a GPS. The position information includes a geographic location of the terminal, and the geographic location of the terminal can be set or updated according to the position information.

In this embodiment, the terminal can be connected to a backbone network or an IP network through various access devices. When one working access device is interfered by other systems or other equipment, the terminal can access the backbone network or the IP network through another access device, and report the detection result of the channel being interfered, so that the interference is accurately found in time. In this embodiment, the access device of the terminal may be various wireless network cards, such as a WRAN network card, a WiMAX network card, a WiFi network card, or may be an ADSL network card or an Ethernet card. In this embodiment, the access device at least includes a wireless network card configured to detect an ambient wireless environment of the terminal, so that the channel status of the channel can be detected by the wireless network card. The terminal may have multiple network functions. Each access device is connected to an access network compliant with the access device, and is connected to the backbone network or the IP network through the access network. Therefore, the terminal can perform communication connection with other equipment in the backbone network or the IP network through the backbone network or the IP network. For example, the first access device may be a WRAN network card, and the second access device may be an Ethernet card. When the WRAN network card is interfered by other systems or equipment and cannot access a WWAN compliant with the WRAN network card, the terminal can be connected to the backbone network through the Ethernet card. At the same time, a channel detection result detected by the WRAN network card can be reported to a management center of the backbone network through the Ethernet card. The management center adjusts communication parameters of an interference source or a base station of the WWAN system thereof according to the reported result, to eliminate the interference. Therefore, communication dead zones are prevented, and the terminal can be connected to the WWAN through the WRAN network card. At the same time, the management center may further confirm other equipment around the terminal according to the reported result to find possible hidden nodes, and the probability of long-term interference on the hidden nodes is reduced.

In this embodiment, the terminal may also receive a detection command or a detection request sent by the management center to detect a specific channel, and report a result to the management center, so that the management center can query or manage radio channel use condition conveniently to adjust communication parameters of equipment of each system. Thus, the communication dead zones are prevented.

In the embodiment of the present invention, the terminal may access the backbone network or the IP network through multiple kinds of access devices. When one access device is interfered and therefore cannot access the backbone network or the IP network, the received channel detection result detected by the equipment being interfered can be reported to the destination equipment through another access device, and the interference is eliminated by the destination equipment. Therefore, the communication dead zones and the hidden nodes are prevented, and the interference between the systems is reduced.

Figure 6:
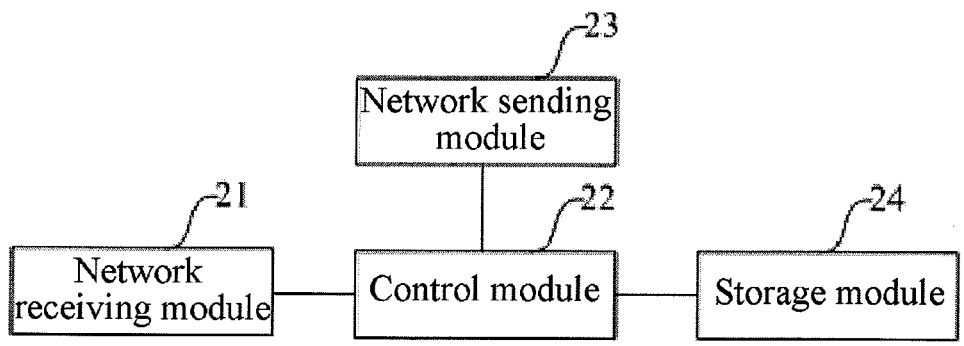
FIG. 6 is a schematic structural view of an embodiment of a management center according to the present invention.

Referring to FIG. 6, it is a schematic structural view of an embodiment of a management center according to the present invention. In this embodiment, the management center includes a network receiving module 21, a control module 22, and a network sending module 23. The network receiving module 21 is configured to receive a channel detection result sent by a terminal, in which the channel detection result includes an ID of the terminal and a channel status of a channel. The control module 22 is configured to generate an adjustment command according to the channel detection result and/or an operational status of other equipment of an area of the terminal, in which the adjustment command is used to adjust communication parameters of relevant equipment of the channel detected by the terminal. The network sending module 23 is configured to send the adjustment command generated by the control module 22 to relevant equipment in a backbone network or an IP network. The equipment receiving the adjustment command adjusts the communication parameters thereof.

In this embodiment, the management center may further include a storage module 24, configured to store the channel detection result sent by the terminal, and add the channel detection result into a radio spectrum distribution condition of the area of the terminal. The radio spectrum distribution condition includes an ID and a working frequency of each piece of equipment in the area, and may further include a location, antenna parameters, and a transmission power of the equipment. Specifically, the management center according to this embodiment may act as a national spectrum management center, or temporary spectrum detection equipment.

In this embodiment, the management center may receive channel detection results reported by different terminals through the backbone network or the IP network, organize the detection results according to the areas of the terminals, and adjust communication parameters of each piece of equipment in the area according to the radio spectrum distribution condition, so that communication dead zones are prevented, interference between systems is reduced. In addition, time possible hidden nodes are searched, and the probability of long-term interference on the hidden nodes is reduced.

Figure 7:
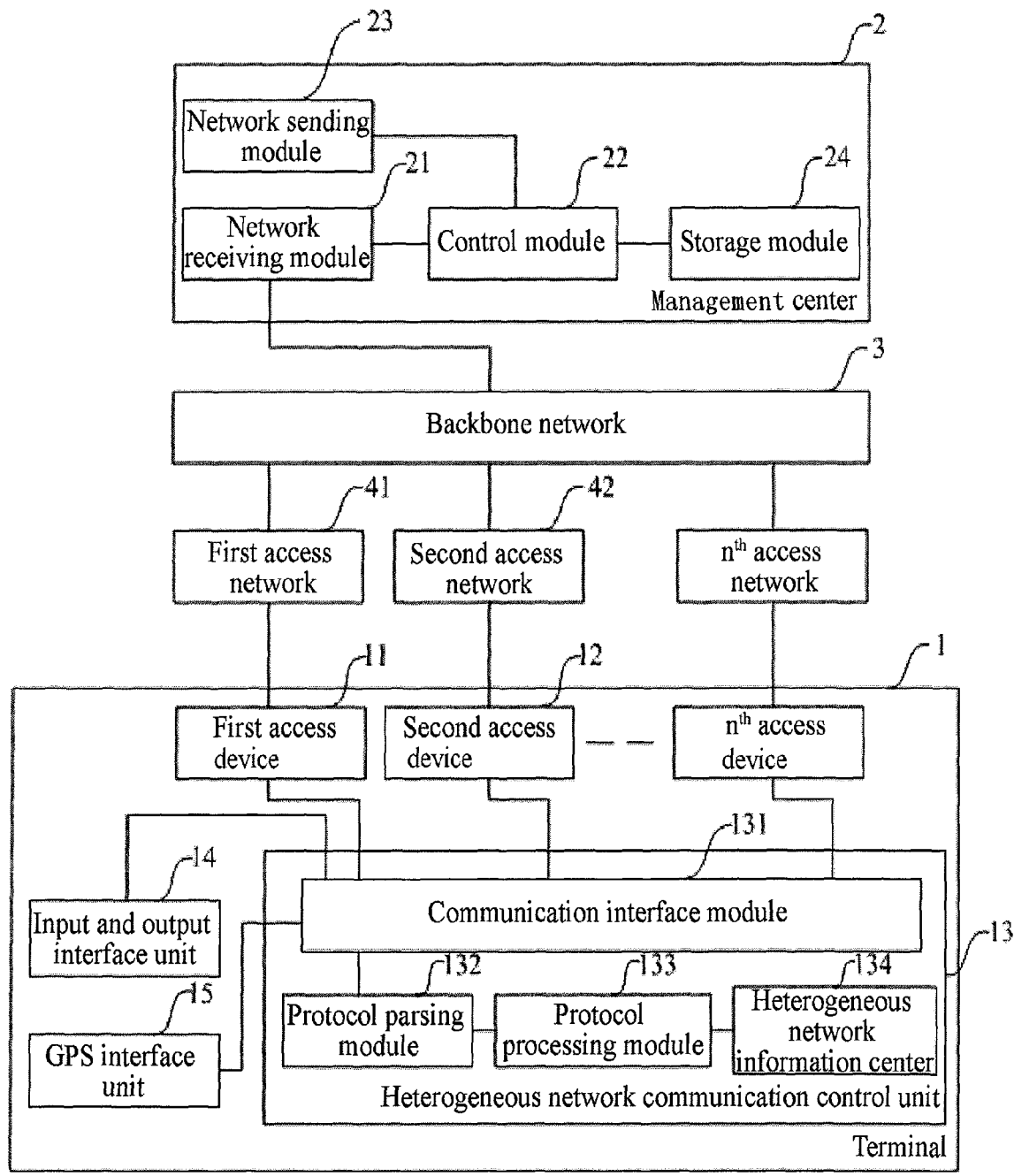
FIG. 7 is a schematic structural view of an embodiment of a system of channel detecting and reporting according to the present invention.

Referring to FIG. 7, it is a schematic structural view of an embodiment of a system of channel detecting and reporting according to the present invention. In this embodiment, the system of channel detecting and reporting includes a terminal 1 and a management center 2. The terminal 1 is configured to detect a channel status of a channel, and send a channel detection result to the management center 2 through different access networks; or is configured to receive a channel detecting command sent by the management center 2, and detect the channel to be detected according to the detection command. The management center 2 is configured to receive the channel detection result sent by the terminal 1, and send an adjustment command according to the channel detection result to adjust communication parameters of relevant equipment that affects the channel detected by the terminal 1, or is configured to send the channel detecting command to the terminal 1. The terminal 1 may be connected to various access networks, and is connected to a backbone network 3 through the access network. Information can be transmitted between the terminal 1 and the management center 2 through the backbone network 3.

In this embodiment, the terminal 1 may include at least two access devices, among which first access device 11 is configured to detect the channel status of the channel, and second access device 12 is configured to report the channel detection result of the channel to destination equipment through the access network. The channel detection result includes an ID of the terminal 1 and the channel status. The channel status includes a status indicating whether the channel is idle or whether interference exists. The terminal 1 may further include a heterogeneous network communication control unit 13, configured to receive the channel detecting command, parse and process the detection command, and send the detection command to the first access device 11; or is configured to process and parse the channel detection result of the channel, and send the channel detection result to the second access device 12. In this embodiment, each access device has a corresponding access network connected to the access device. The first access device 11 can be connected to a first access network 41, and the second access device 12 can be connected to a second access network 42. Accordingly, another access device can be connected to a corresponding access network thereof, and the terminal 1 is connected to the backbone network 3 through the access network. Therefore, the terminal 1 can perform communication connection with the destination equipment in the backbone network through the backbone network to transmit information. The access networks connected to each access device may include a base station, and the base station performs the communication connection with the backbone network 3.

In this embodiment, the heterogeneous network communication control unit 13 may include a communication interface module 131, a protocol parsing module 132, a protocol processing module 133, and a heterogeneous network information center 134. The communication interface module 131 is configured to receive the channel detection result from the first access device 11, and send the channel detection result to a protocol parsing module 132; or is configured to receive the detection command from the second access device 12, and send the detection command to the protocol parsing module 132; or is configured to receive the channel detecting command from the protocol parsing module 132, and send the channel detecting command to the first access device 11; or is configured to receive the channel detection result from the protocol parsing module 132, and send the channel detection result to the second access device 12. The protocol parsing module 132 is configured to receive the channel detection result or the detection command sent by the communication interface module 131, parse the channel detection result or the detection command into data in a format that may be identified by the terminal, and send the formatted data to the protocol processing module 133; or is configured to receive a signal of the protocol processing module 133, parse the signal into data in a format that may be identified by corresponding access device, and send the formatted data to the communication interface module 131. The protocol processing module 133 is configured to receive the data in a format that may be identified by the terminal 1 and sent by the protocol parsing module 132, send the channel detection result or the detection command to the protocol parsing module 132 or the heterogeneous network information center 134 after processing the channel detection result or the detection command. The processing performed by the protocol processing module 133 may include, but is not limited to, merging some channel detecting commands, triggering a channel detecting command, or merging some channel detection results. The heterogeneous network information center 134 is configured to obtain and store an operational status and parameters of each access device of the terminal. The parameters include channel information of a channel that may be detected by the access device and protocol format information of the access network that may be accessed by the access device. The working status and the parameters of each access device of the terminal 1 are obtained by the protocol processing module 133 from each access device.

In this embodiment, the management center 2 may include a network receiving module 21, a control module 22, and a network sending module 23. The network receiving module 21 is configured to receive the channel detection result sent by the terminal 1, in which the detection result of the channel includes the ID of the terminal 1 and the channel status of the detected channel. The control module 22 is configured to generate the adjustment command according to the channel detection result and/or an operational status of other equipment of an area of the terminal 1, in which the adjustment command is used to adjust communication parameters of relevant equipment of the channel detected by the terminal 1. The network sending module 23 is configured to send the adjustment command generated by the control module 22 to the relevant equipment. The equipment receiving the adjustment command adjusts the communication parameters thereof. The adjustment of the communication parameters may be the adjustment of a working channel, or the adjustment of other parameters such as a transmission power. In this embodiment, the management center may further include a storage module 24, configured to store the channel detection result sent by the terminal 1, and add the channel detection result into a radio spectrum distribution condition of the area of the terminal 1. The radio spectrum distribution condition includes an ID and a working frequency of each piece of equipment in the area, and may further include a location, antenna parameters, and transmission power of each piece of equipment.

In this embodiment, the access device may be various wireless network cards, such as a WRAN network card, a WiMAX network card, a WiFi network card, or may be an ADSL network card or an Ethernet card. In this embodiment, the access device at least includes a wireless network card, configured to detect an ambient wireless environment of the terminal, so that the channel status of the channel can be detected by the wireless network card. Accordingly, the access networks that may be accessed by the second access device 12 may be a WLAN, a WMAN, a cellular mobile network, a WPAN, a WWAN, or Ethernet. Each access network may include a corresponding base station, and is connected to the backbone network 3 through the base station. The backbone network 3 may be the Internet, or may be a PSTN. Each access device is connected to an access network compliant with the equipment, and accesses the backbone network 3 through the access network.

In this embodiment, the first access device 11 may be a WRAN network card, and a corresponding access network thereof is a WWAN. The terminal 1 may establish communication connection with the backbone network 3 through the WWAN. The second access device 12 may be an Ethernet card, and is connected to the backbone network 3 through the Ethernet card, in which the backbone network 3 is the Internet. The management center 2 may be a radio spectrum management center, configured to manage the radio spectrum distribution condition, and can adjust communication parameters of relevant equipment in the backbone network 3.

Figure 1:
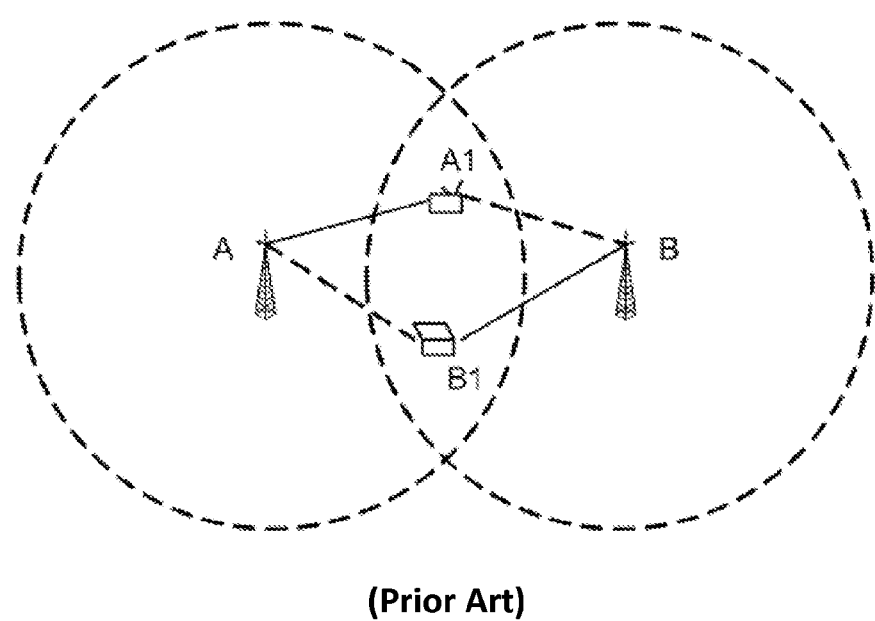
FIG. 1 is a schematic diagram of interference generated between nodes in a wireless communication system.

Assuming that the terminal 1 according to the embodiment of the present invention is a node B1 in FIG. 1, if not being interfered, the node B1 may be connected to a base station B in the WWAN through the WRAN network card, a node A is a TV transmitter, and a node A1 is a TV receiver. When the terminal is turned on, the node A interferes with the WRAN network card of the terminal, so the terminal cannot be connected to the base station B in the WWAN through the WRAN network card, therefore, a communication dead zone is generated in the area of the terminal in a WWAN system. At the same time, the TV receiver may also be interfered by the base station B, and cannot receive a TV signal sent by the TV transmitter. Here, the terminal may be connected to the Internet though the Ethernet card, and the interference on the WRAN network card can be reported to the radio spectrum management center in the Internet through the Ethernet card. The radio spectrum management center adjusts communication parameters of the base station B or the transmitter A according to the reported detection result, so that communication dead zones are prevented, and the probability of long-term interference on hidden nodes is reduced. Specifically, the process includes the following steps:

Step 401: After a terminal is turned on, it can be connected the terminal to the Internet through an Ethernet card when a WRAN network card is interfered and therefore cannot be connected to a WWAN.

Step 402: A heterogeneous network communication control unit of the terminal sends a channel detecting command to the WRAN network card. After receiving the detection command, the WRAN network card performs channel detecting.

Step 403: The WRAN network card sends a channel detection result to the heterogeneous network communication control unit. The heterogeneous network communication control unit processes the detection result. A part of or all the detection data may be reported as required. The detection result to be reported is sent to the Ethernet card after being parsed. The Ethernet card is required to report the detection result to a radio spectrum management center in the network.

Step 404: The Ethernet card sends the received data including the detection result to the radio spectrum management center through the Internet.

Step 405: After receiving the channel detection result, the radio spectrum management center performs corresponding processing.

The radio spectrum management center may add the detection result to a radio spectrum distribution condition of an area of the terminal according to a geographic location of the terminal, and adjust communication parameters of relevant equipment according to the situation of the interference on the terminal. Specifically, upon confirming that a channel ch1 of the WRAN network card of the terminal is subject to unknown interference, the radio spectrum management center confirms that the base station B and the TV transmitter A may interfere with equipment in the link of each other according to the radio spectrum distribution condition stored in a database of the radio spectrum management center. Here, the radio spectrum management center may send a command through the network to adjust communication parameters of the base station B, and request the base station B to select another idle channel ch2.

Furthermore, the radio spectrum management center may further actively request the terminal to perform detection on a specific channel. For example, when the base station B is switched to the idle channel ch2, a detection command may be sent to the terminal through the network to request the terminal to continue with the detection to detect a channel condition of the terminal in the channel ch1 and the channel ch2 to confirm whether the terminal can work in the channel ch2 normally, so that the terminal can be connected to the base station B in the WWAN through the WRAN network card normally.

Furthermore, the terminal may also perform specific channel detecting as required. The specific channel detecting can be designated by the heterogeneous network communication control unit of the terminal, or by input of other subscribers through an input and output interface unit, or by a specific detection command sent by other equipment.

According to the embodiments of the present invention, the channel may be a radio resource of a frequency, a time domain, or a code domain, or a combination thereof.

According to the embodiments of the present invention, the terminal includes, but is not limited to, a mobile phone, a PDA, a notebook computer, and a desktop computer of a subscriber.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be a magnetic disk, an optical disk, a Read-Only Memory (ROM), or a Random Access Memory (RAM).

Finally, it should be noted that the above embodiments are merely provided for describing the technical solutions of the present invention, but not intended to limit the present invention. It should be understood by persons of ordinary skill in the art that although the present invention has been described in detail with reference to the preferred embodiments, modifications or equivalent replacement can be made to the technical solutions of the present invention, but the modifications or equivalent replacement still cannot depart the modified technical solutions from the spirit and scope of the present invention.

What is claimed is:

1. A method of wireless channel detecting and reporting, comprising:

detecting by a first access device of a terminal, a channel status of one or more channels in wireless communication; and reporting by a second access device of the terminal, a channel detection result obtained through the detecting by the first access device, to a destination equipment through an access network, wherein the channel status comprises a status indicating whether interference exists in the one or more channels in the wireless communication;

wherein the terminal comprises at least the first and second access devices and a communication interface module; and the communication interface module is configured to receive the channel detection result from the first access device and to send the channel detection result to the second access device, wherein before the reporting by the second access device to the destination equipment through the access network:

processing and parsing the detection result detected by the first access device into data satisfying a data transmission protocol format of the second access device; and sending the data satisfying the data transmission protocol format of the second access device to the second access device.

2. The method of channel detecting and reporting according to claim 1, wherein the detecting of the terminal, the channel status of one or more channels comprising:

detecting by the first access device of the terminal, the channel status of the one or more channels through periodical setting or event driving.

3. The method of channel detecting and reporting according to claim 2, wherein the detecting through the periodical setting or the event driving comprising one of:
receiving a detection command of the channel, processing the detection command, and sending the detection command to the first access device; or
setting a detection command of the channel, and sending the detection command to the first access device; or
receiving a detection command input from outside, wherein the detection command comprises the channel to be detected and detection time, and sending the detection command to the first access device.

4. The method of channel detecting and reporting according to claim 3, wherein the receiving of the detection command of the channel, the processing of the detection command, and the sending of the detection command to the first access device comprising:
receiving by the second access device, the detection command of the channel, and parsing the detection command into data that may be identified by the terminal;
processing the detection command that may be identified by the terminal; and
parsing the processed detection command into data in a format that may be identified by the first access device, and sending the detection command to the first access device.

5. The method of channel detecting and reporting according to claim 1, wherein the reporting of the channel detection result by the second access device to the destination equipment through the access network comprising:
sending, by the second access device, the channel detection result to the access network of the second access device, and sending, by the access network, the channel detection result to the destination equipment.

6. The method of channel detecting and reporting according to claim 1, wherein the channel detection result comprises one or more of: an identity (ID) of the terminal, the channel status, a central frequency of the channel, a bandwidth of the channel, a signal energy of the channel received by the terminal, the time of the detection performed by the terminal on the channel, and a geographic location of the terminal during detection.

7. A method for managing a wireless channel detection result, comprising:
receiving a channel detection result sent by a second access device of a terminal, wherein the channel detection result is detected by a first access device of the terminal, and the channel detection result comprises an identity (ID) of the terminal and a channel status of a channel in wireless communication; and
sending by the second access device, an adjustment command to adjust communication parameters of equipment that affects the channel detected by the terminal according to the channel detection result of the channel,
wherein the channel status comprises a status indicating whether interference exists in the channel in the wireless communication;
wherein the terminal comprises at least the first and second access devices and a communication interface module; and the first and second access devices are coupled to the communication interface module,
wherein before the reporting by the second access device to the destination equipment through the access network:
processing and parsing the detection result detected by the first access device into data satisfying a data transmission protocol format of the second access device; and sending the data satisfying the data transmission protocol format of the second access device to the second access device.

8. The method for managing a channel detection result according to claim 7, wherein after the receiving of the channel detection result sent by the terminal, the method further comprising:
storing the channel detection result of the channel sent by the terminal, and adding the channel detection result into a radio spectrum distribution condition of an area of the terminal, wherein the radio spectrum distribution condition comprises an ID and a working frequency of each piece of equipment in the area.

9. The method for managing a channel detection result according to claim 7, wherein the sending the adjustment command to adjust the communication parameters of the equipment that affects the channel detected by the terminal, according to the channel detection result of the channel comprising:
sending the adjustment command to adjust working parameters affecting the terminal or working parameters of the equipment in a working system of the terminal according to the channel detection result.

10. A wireless terminal, comprises:
at least two access devices, wherein a first access device configured to detect a channel status
of a channel in wireless communication, and a second access device configured to report a channel detection result of the channel to destination equipment through an access network, wherein the detection result comprises the channel status; wherein the channel status comprises a status indicating whether interference exists in the channel in the wireless communication; and
a communication interface module, configured to receive the channel detection result from the first access device, and receive the detection command from the second access device; wherein the two access devices are coupled to the communication interface module,
wherein before the reporting by the second access device to the destination equipment through the access network:
processing and parsing the detection result detected by the first access device into data satisfying a data transmission protocol format of the second access device; and sending the data satisfying the data transmission protocol format of the second access device to the second access device.

11. The terminal according to claim 10, further comprises:
a heterogeneous network communication control unit, configured to receive a detection command of the channel, parse and process the detection command, and send the detection command to the first access device; process and parse the channel detection result of the channel, and send the channel detection result to the second access device.

12. The terminal according to claim 11, wherein the heterogeneous network communication control unit comprises:
the communication interface module,
a protocol parsing module, configured to receive the channel detection result or the detection command sent by the communication interface module, and parse the channel detection result or the detection command into data in a format that may be identified by the terminal; and
a protocol processing module, configured to receive the data in a format that may be identified by the terminal and sent by the protocol parsing module, and send the channel detection result or the detection command to the protocol parsing module after processing the channel detection result or the detection command;

wherein the communication interface module is further configured to receive the detection command from the protocol parsing module, and send the channel detecting command to the first access device, receive the channel detection result from the protocol parsing module, and send the channel detection result to the second access device; the protocol parsing module is further configured to receive the channel detection result or the detection command processed by the protocol processing module, parse the channel detection result or the detection command into data in a format that may be identified by corresponding access device, and send the formatted data to the communication interface module.

13. The terminal according to claim 12, wherein the heterogeneous network communication control unit further comprises:

a heterogeneous network information center, configured to obtain and store an operational status and parameters of each access device of the terminal, wherein the parameters comprise information of a channel that may be detected by the access devices and protocol format information of the access network that may be accessed by the access device, and the working status and the parameters of each access device of the terminal are obtained by the protocol processing module from each access device.

14. The terminal according to claim 10, further comprises:

an input and output interface unit, configured to input the detection command of the channel, and output the channel detection result of the channel.

15. A management center for managing a wireless channel detection result, comprises:

a network receiving module, configured to receive a channel detection result sent by a second access device of a terminal, wherein the channel detection result is detected by a first access device of the terminal, and the channel detection result comprises an identity (ID) of the terminal and a channel status of a channel in wireless communication;

a control module, configured to generate an adjustment command according to the channel detection result of the channel and/or an operational status of other equipment in an area of the terminal, wherein the adjustment command is adapted to adjust communication parameters of the other equipment that affects the channel detected by the terminal; and a network sending module, configured to send the adjustment command generated by the control module to the equipment that affects the channel detected by the terminal, wherein the channel status comprises a status indicating whether interference exists in the channel in the wireless communication;

wherein the terminal comprises at least the first and second access devices and a communication interface module; and the first and second access devices are coupled to the communication interface module, wherein before the reporting by the second access device to the other equipment through the access network:

processing and parsing the detection result detected by the first access device into data satisfying a data transmission protocol format of the second access device; and sending the data satisfying the data transmission protocol format of the second access device to the second access device.

16. The management center according to claim 15, further comprises:

a storage module, configured to store the channel detection result of the channel sent by the terminal, and add the channel detection result into a radio spectrum distribution condition of the area of the terminal, wherein the radio spectrum distribution condition comprises an ID and a working frequency of each piece of equipment in the area.

17. A system of wireless channel detecting and reporting, comprises a terminal and a management center, wherein the terminal is configured to detect a channel status of a channel in wireless communication, and send a channel detection result of the channel to the management center through different access networks; or the terminal is configured to receive a channel detecting command of the channel sent by the management center, and detect the channel according to the detection command; and the management center is configured to receive the channel detection result of the channel sent by the terminal, and send an adjustment command to adjust communication parameters of equipment that affects the channel detected by the terminal according to the channel detection result, or the management center is configured to send the channel detecting command of the channel to the terminal, wherein the terminal comprises at least two access devices and a communication interface module, a first access device configured to detect the channel status of the terminal, a second access device configured to report the channel detection result of the channel to destination equipment through the access network;

wherein the first and second access devices are coupled to the communication interface module; and wherein the channel status comprises a status indicating whether interference exists in the channel in the wireless communication, wherein before the reporting by the second access device to the destination equipment through the access network:

processing and parsing the detection result detected by the first access device into data satisfying a data transmission protocol format of the second access device; and sending the data satisfying the data transmission protocol format of the second access device to the second access device.

18. The system of channel detecting and reporting according to claim 17, wherein the detection result comprises an identity (ID) of the terminal and the channel status.

19. The system of channel detecting and reporting according to claim 18, wherein the terminal further comprises:

a heterogeneous network communication control unit comprising at least the communication interface unit, configured to:

receive the detection command of the channel, parse and process the detection command, and send the detection command to the first access device;

process and parse the channel detection result of the channel; and send the channel detection result to the second access device.

* * * * *